United States Patent
Hegde et al.

(10) Patent No.: US 8,576,847 B2
(45) Date of Patent: Nov. 5, 2013

(54) MECHANISMS FOR DISCOVERING PATH MAXIMUM TRANSMISSION UNIT

(75) Inventors: Yogesh L. Hegde, Bangalore (IN); David R. Marquardt, Round Rock, TX (US); Prashant A. Paranjape, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 12/868,819

(22) Filed: Aug. 26, 2010

(65) Prior Publication Data

US 2012/0051236 A1    Mar. 1, 2012

(51) Int. Cl.
*H04L 12/28* (2006.01)
(52) U.S. Cl.
USPC .......................................... 370/392; 370/474
(58) Field of Classification Search
None
See application file for complete search history.

(56) References Cited

U.S. PATENT DOCUMENTS

| | | | |
|---|---|---|---|
| 5,959,974 A | 9/1999 | Badt et al. | |
| 6,804,624 B2 * | 10/2004 | Silverman | 702/159 |
| 7,336,615 B1 * | 2/2008 | Pan et al. | 370/248 |
| 7,451,227 B2 * | 11/2008 | Lee et al. | 709/232 |
| 7,680,047 B2 * | 3/2010 | Vadlakonda et al. | 370/235 |
| 2004/0071140 A1 * | 4/2004 | Jason et al. | 370/392 |
| 2005/0281288 A1 * | 12/2005 | Banerjee et al. | 370/477 |
| 2009/0285238 A1 * | 11/2009 | Shiraishi | 370/474 |
| 2011/0072129 A1 * | 3/2011 | Le Pennec et al. | 709/224 |
| 2011/0090851 A1 * | 4/2011 | Khalil et al. | 370/328 |

FOREIGN PATENT DOCUMENTS

JP    2009231986    10/2009

* cited by examiner

*Primary Examiner* — Donald Mills
(74) *Attorney, Agent, or Firm* — Stephen J. Walder, Jr.; Libby Z. Toub

(57) ABSTRACT

Mechanisms are provided for determining a path maximum transmission unit of a path between a source node and a destination node of the path. These mechanisms transmit an echo request packet from the source node to the destination node along the path. The mechanisms further determine, by at least one intermediate node along the path, whether a size of the echo request packet is greater than a maximum transmission unit (MTU) of a next link of the path from the intermediate node to a next node along the path. Moreover, the mechanisms record, by the at least one intermediate node, the MTU of the next link in the echo request packet in response to the determination that the size of the echo request packet is greater than the MTU of the next link.

15 Claims, 6 Drawing Sheets

US 8,576,847 B2

MECHANISMS FOR DISCOVERING PATH MAXIMUM TRANSMISSION UNIT

BACKGROUND

The present application relates generally to an improved data processing apparatus and method and more specifically to mechanisms for discovering path maximum transmission unit (MTU) while eliminating packet-sent/packet-too-big-message-received iterations and eliminating security concerns involving false messages that indicate a path MTU larger/smaller than reality.

Request for Comment (RFC) 1981 entitled "Path MTU Discovery for IP Version 6," August 1996, available from the Internet Engineering Task Force (IETF) describes a technique to dynamically discover the path maximum transmission unit (PMTU) of a path. The PMTU is defined as the largest size data packet that can successfully traverse the path from a source node to a destination node without being fragmented. With the technique described in RFC 1981, a source node initially assumes that the PMTU of a path is the known MTU of the first hop in the path. If any of the packets sent on that path are too large to be forwarded by some node along the path, that node will discard them and return an Internet Control Message Protocol version 6 (ICMPv6) Packet Too Big messages. Upon receipt of such an ICMPv6 Packet Too Big message, the source node reduces its assumed PMTU for the path based on the MTU of the constricting hop as reported in the ICMPv6 Packet Too Big message.

The PMTU discovery process ends when the source node's estimate of the PMTU is less than or equal to the actual PMTU. Note that several iterations of the packet-sent/Packet-Too-Big-message-received cycle may occur before the PMTU discovery process ends, as there may be links with smaller MTUs than the assumed PMTU further along the path each time the PMTU is re-calculated. Thus, there may be considerable overhead in determining the PMTU using the technique described in the RFC 1981.

In addition, as described in section 6 of RFC 1981, entitled "Security Considerations," the PMTU discovery technique described in the RFC 1981 makes possible two denial-of-service attacks, both of which are based on a malicious party sending false Packet Too Big messages to a node.

In a first possible denial-of-service attack, the false Packet Too Big message indicates a PMTU much smaller than reality. This will not entirely stop data flow since the victim node will not set its PMTU estimate below the IPv6 minimum link MTU. It will, however, result in sub-optimal performance.

In a second possible denial-of-service attack, the false Packet Too Big message indicates a PMTU larger than reality. If believed, this message could cause a temporary blockage as the victim node sends packets that will be dropped by a later node. Within one round-trip time, the victim node will discover its mistake, but frequent repetition of this attack may cause a large number of packets to be dropped.

SUMMARY

In one illustrative embodiment, a method, in a data processing system, is provided for determining a path maximum transmission unit of a path between a source node and a destination node of the path. The method comprises transmitting an echo request packet from the source node to the destination node along the path. The method further comprises determining, by at least one intermediate node along the path, whether a size of the echo request packet is greater than a maximum transmission unit (MTU) of a next link of the path from the intermediate node to a next node along the path. Moreover, the method comprises recording, by the at least one intermediate node, the MTU of the next link in the echo request packet in response to the determination that the size of the echo request packet is greater than the MTU of the next link.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
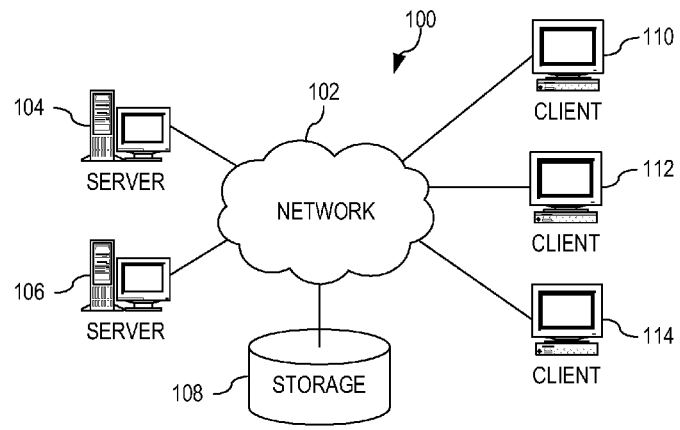
FIG. 1 is an example block diagram of a distributed data processing system in which aspects of the illustrative embodiments may be implemented.

The illustrative embodiments provide mechanisms for discovering path maximum transmission unit (MTU) while eliminating packet-sent/packet-too-big-message-received iterations and eliminating security concerns involving false messages that indicate a path MTU larger/smaller than reality. These mechanisms involve a new packet for measuring the path MTU (PMTU), the packet being referred to as the "echo request with PMTU measurement" packet herein, and a new operation for using this new packet to measure the PMTU. The operation involves a source node setting a MTU field of the packet to a sender link MTU of a link from the source node to a next node along the path. The size of the packet is set to the maximum MTU packet size for the next hop or link along the path. Each intermediate node along the path routes packets in a usual manner if the packet size does not exceed the next-hop link MTU.

However, if the packet size is larger than the maximum MTU of a next-hop link, rather than generating a Packet Too Big packet and sending it back to the source node, the intermediate node truncates the packet to a size equal to the next-hop MTU and reduces the value in the MTU field of the packet to a value equal to the next-hop MTU. The downsized packet is then forwarded to the next node over the next-hop link towards the destination node. The packet continues the journey to the destination node with the packet being reduced in size and the MTU field being updated when necessary as the packet moves along the path. At the destination node, a reply message is generated using the MTU field of the packet that was sent as the maximum path MTU along the source-destination path. Thus, the source node is informed of the maximum path MTU without having to repeatedly process Packet Too Big messages. Moreover, nodes are not able to cause denial-of-service attacks using Packet Too Big messages since such messages are not returned to the source node.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
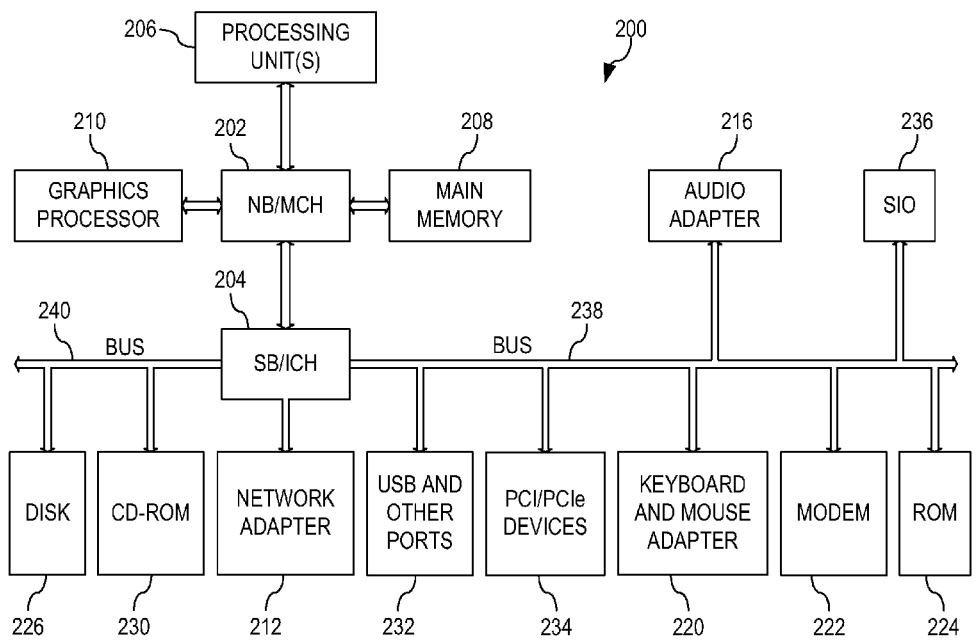
FIG. 2 is an example block diagram of a data processing device in which aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

As mentioned above, the mechanisms of the illustrative embodiments utilize a new type of packet that is used to measure the path maximum transmission unit (PMTU) as the packet is transmitted along the path to the destination node. The packet is an echo request packet that requests that the destination node respond with a reply message packet echoing the contents of the request packet. In this case, however, the echo request packet is modified to include fields for measuring the maximum transmission unit along the path, i.e. the PMTU. These fields are updated as the packet is transmitted along the path so as to store the smallest MTU along the path such that this information may be returned to the source node in an echo reply message packet sent from the destination node back to the source node. This is done without the intermediate nodes sending back Packet Too Big messages to the source node and having the source node have to modify the packet and resend it to determine the PMTU.

Figure 3:
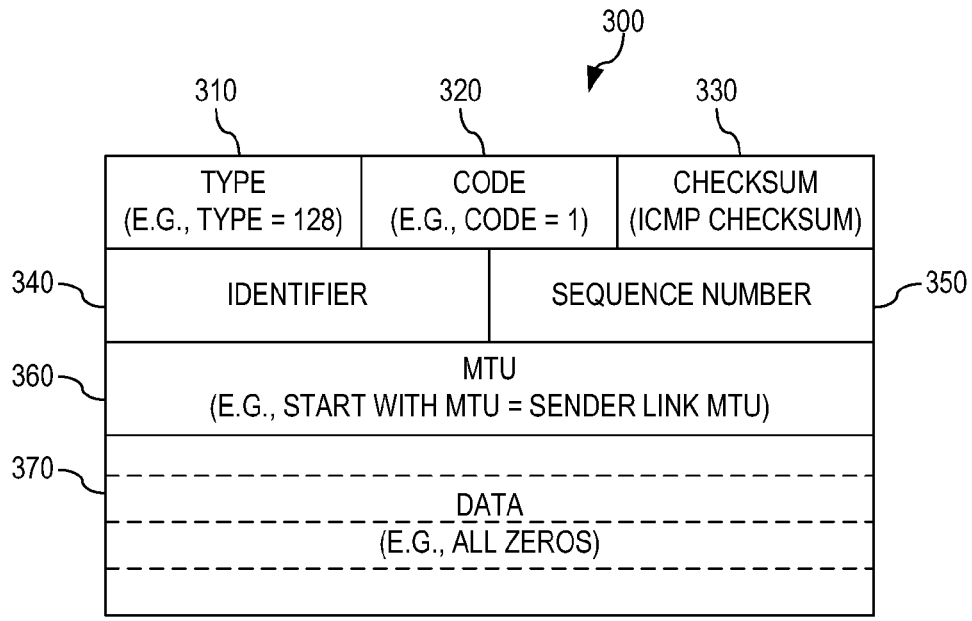
FIG. 3 is an example diagram illustrating an echo request with PMTU measurement packet format in accordance with one illustrative embodiment.

FIG. 3 is an example diagram illustrating an "echo request with PMTU measurement" packet format in accordance with one illustrative embodiment. As shown in FIG. 3, the packet 300 includes a type field 310, a code field 320, a checksum field 330, an identifier field 340, a sequence number field 350, a MTU field 360, and data field(s) 370 which contain user data. The actual contents of the data field(s) 370 are not material to the operation of the illustrative embodiments and thus, may be filled with all zeros or other "don't care" value. The packet length (including additional protocol headers that are added subsequently as this packet goes to lower layers, such as the IP layer, Ethernet layer, etc. down to actual wire) should be equal to the MTU of the link that is stored in field 360 as discussed in more detail hereafter.

The type field 310 is set to a value indicating that the packet 300 is an echo request type of packet that requests that the destination node return a reply message packet with the information from the echo request packet being included in the reply message packet. The code field 320 is set to a value indicating that the echo request is an echo request with PMTU measurement. Thus, the combination of the type field 310 value and code field 320 value indicates the packet 300 to be an echo request with PMTU measurement packet 300.

The checksum field 330 provides a checksum value for ensuring the validity of the packet's data. As the packet's data portion is updated as the packet is transmitted along the path, as described hereafter, the checksum field 330 may be updated to represent a new checksum corresponding to the updated data portion of the packet.

The identifier field 340 and sequence number field 350 are generated by a source node and are used to assist the source node in matching the returning echo reply messages that will be returned by the destination node in response to receiving this "echo request with PMTU measurement" packet 300. These values are chosen such that the source node does not repeat them for a long enough time to ensure that lingering packets somewhere in the network, e.g., the internet, sent from the source node do not come back and get mixed up with a similar valid packet sent recently and for which the source node is awaiting a response. The identifier field 340 and sequence number field 350 may be set to zero in some instances.

The maximum transmission unit (MTU) field 360 stores the value for the maximum transmission unit so far along the path from the source node to the destination node. That is, the value stored in the MTU field 360 is initially set to a value corresponding to the MTU for the link between the source node and the first intermediate node along the path to the destination node. Nodes are connected to physical links using adapters (e.g., Ethernet adapter, fibre channel adapter, Infiniband (IB) adapter). The adapter's characteristics are made known to the node when the node's operating system configures those adapter under root user direction during network configuration. A measurement program on the node is made aware of an incoming link where it received packets and the outgoing link based on destination address where it wants to send a packet (using a routing table, for example). Based on the network configuration information, and the outgoing link identification, a node may determine a corresponding MTU size associated with the outgoing link and use it to populate the MTU field 360.

Thereafter, if the packet 300 is determined to be too large at any of the intermediate nodes, this value may be updated, as described hereafter, to reflect the minimum MTU along the path from the source node to the destination node. Thus, this field 360 is dynamically updated as the packet 300 is transmitted along the path and the value in this field when the packet 300 is received at the destination node is used to communicate the PMTU, which is equal to the minimum MTU value stored in this field 360, in a reply message packet transmitted from the destination node to the source node.

The data field 370 is populated with bytes that are set to zero values or another "don't care" value. The size of this data field 370 may be dynamically updated as the packet 300 is transmitted along the path to the destination node so as to adjust the size of the packet to match a current minimum MTU value stored in the MTU field 360. The packet length is computed on the complete packet at the data link layer which is about to enter the physical link, since the packet 300 may further be encapsulated by the IP layer, the Ethernet layer (generically called datalink layer in OSI model) and grows in size.

As mentioned above, the packet 300 is transmitted from the source node of a path to the destination node of the path and will typically be processed by one or more intermediate nodes along the path, although in some embodiments it is foreseeable that a packet 300 may be sent directly from the source node to the destination node. The packet 300 is dynamically updated along the path as the intermediate nodes determine that the packet 300 has a size that is greater than a MTU for the particular link over which the packet 300 is to be sent.

Once the packet 300 reaches the destination node, the destination node, recognizing the packet 300 to be an echo request packet based on the setting of the value in the type field 310, generates an echo reply message packet for transmission back to the source node. In accordance with the mechanisms of the illustrative embodiments, the destination node may further determine that the echo request packet is an echo request with PMTU measurement packet based on the setting of the code value in the code field 320. As a result, the destination node may populate fields of the echo reply message with information from the various fields 310-380 of the echo request packet so as to communicate the PMTU for the path back to the source node.

Figure 4:
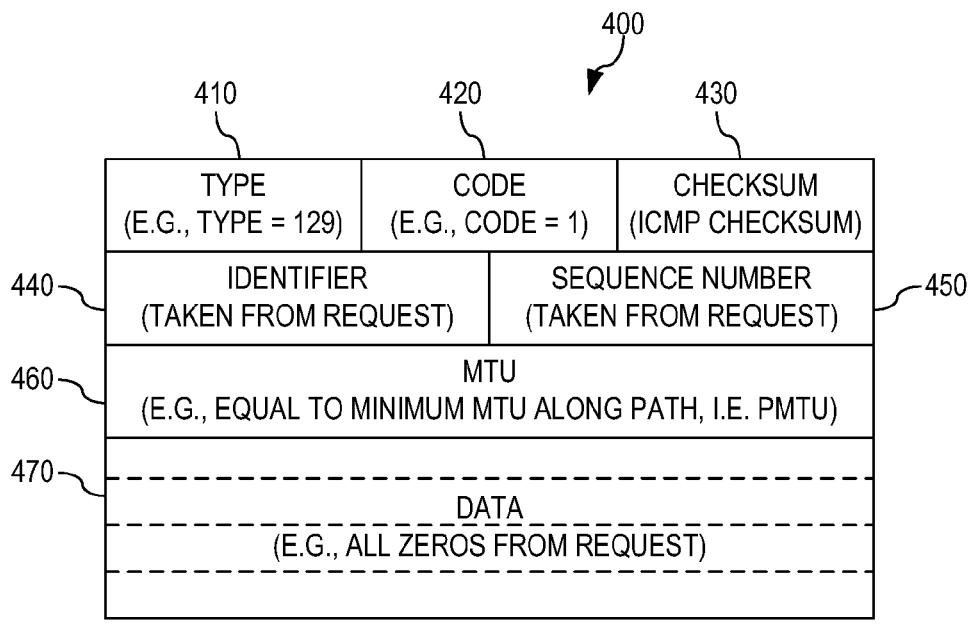
FIG. 4 is an example diagram illustrating an echo reply message format in accordance with one illustrative embodiment.

FIG. 4 is an example diagram illustrating an echo reply message packet format in accordance with one illustrative embodiment. The echo reply message packet 400 has a similar format to the echo request message packet 300 but with fields of the echo reply message packet 400 being populated with values from the echo request message packet 300 that are determined dynamically as the echo request message packet 300 was transmitted along the path.

As shown in FIG. 4, the echo reply message packet 400 includes a type field 410, code field 420, checksum field 430, identifier field 440, sequence number field 450, MTU field 460, and data field 470. In this case, since the packet 400 is an echo reply message packet 400, the type field 410 is set to a value indicative of an echo reply message packet. The code field 420 value is set to a value indicative of the echo reply message packet being one that includes PMTU information, i.e. the packet 400 is an echo reply message with PMTU packet. For example, the code field 420 may be set to a same value as the echo request with PMTU measurement packet's code field 320 value in one illustrative embodiment. The checksum field 430 serves a similar purpose as the checksum field 330 in the echo request with PMTU measurement packet 300.

The identifier field 440 and sequence number field 450 values are taken from the similar fields 340 and 350 in the echo request with PMTU measurement packet 300. These fields 440 and 450 are used by the source node to correlate the echo reply message packet 400 with the original echo request message packet 300. That is, when the echo reply message packet 400 is received by the source node, the source node will find an entry in an echo request data structure associated with a measurement utility of the source node, corresponding to the echo reply message packet 400 by finding an entry having an identifier and sequence number matching that in the echo reply message packet 400. The source node may then record the information from the echo reply message packet 400 in routing software data structures, or other places in the operating system of the source node. This information may be stored in association with the entry found based on the identifier and sequence number in the echo reply message packet 400.

The MTU field 460 stores the minimum MTU along the path traversed by the echo request message packet 300. This value may be retrieved from the MTU field 360 in the echo request message packet 300 received at the destination node. The data field 470 has bytes set to zero and is taken from the echo request message packet 300 data field 370 that is received at the destination node. Thus, the data field 470 may be of a different size than the data field 370 of the original echo request message packet 300 sent by the source node due to it having been modified as the echo request message packet 300 is transmitted along the path to the destination node. Similarly, the packet size field 380, whose value corresponds to the size of the echo reply message packet 400, may have a different size value than that of the original echo request message packet 300 since the packet size of the echo request message packet 300 may have been modified during transmission along the path.

Thus, via the echoing of the PMTU value from the echo request message packet 300 in the echo reply message packet, the source node is informed of the minimum MTU of the path, i.e. the PMTU, so that it can use this value in determining the size of the data packets to send between itself and the destination node along the designated path and avoid any blockages, loss of packets, or extra overhead in resending packets. It should be noted that the determination of the PMTU using the echo request with PMTU measurement packet and echo reply with PMTU packet is done without having the intermediate nodes return Packet Too Big messages and having to iterate on the packet size at the source node with subsequent retransmissions of the packet until a PMTU is determined. Thus, the mechanisms of the illustrative embodiments significantly reduce the overhead associated with determining the PMTU of a path between a source node and a destination node by allowing the echo request message packet to continue along the path without having to process Packet Too Big messages and resending the packet with a smaller size.

Figure 5A:
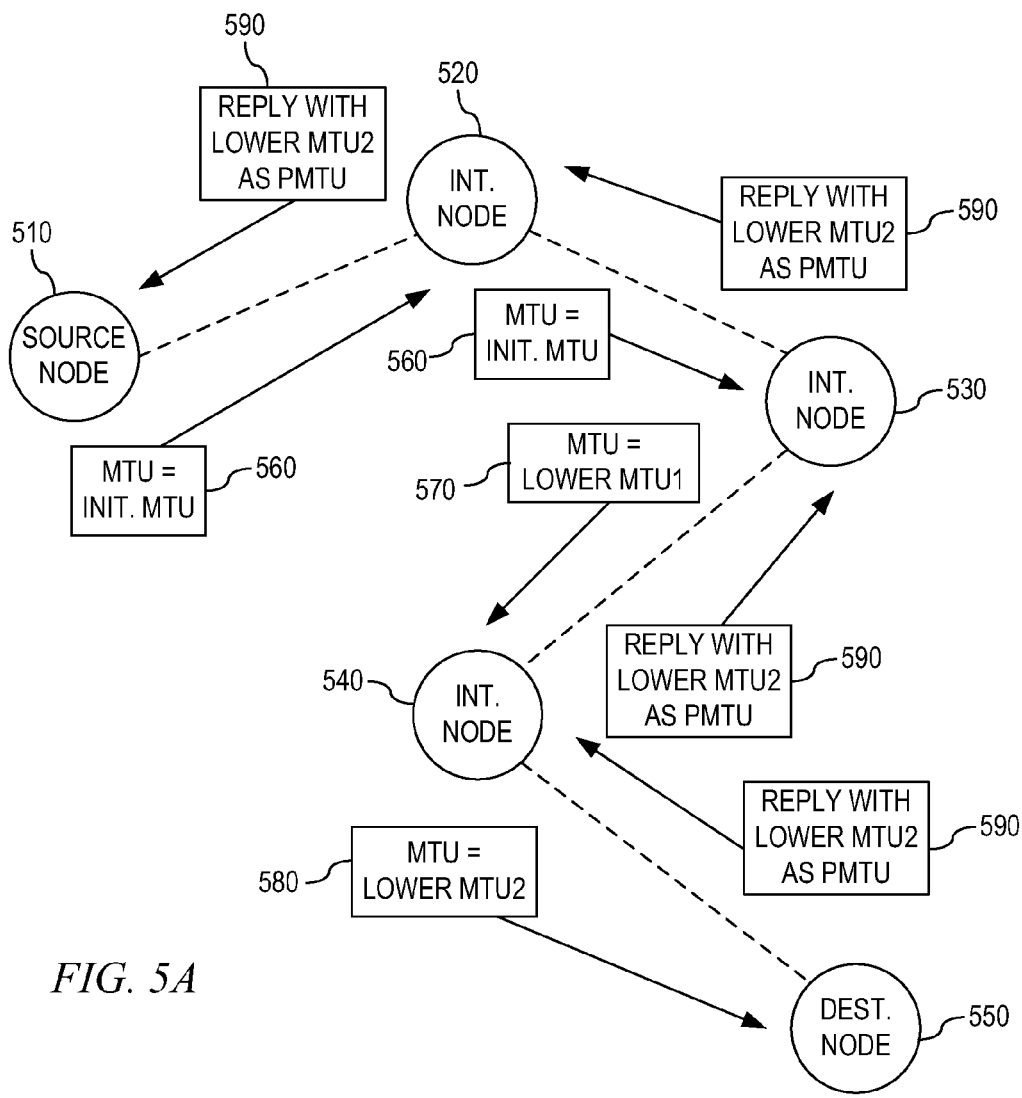
FIG. 5A is an example diagram illustrating an operation along a path from a source node to a destination node of using the request packets and reply messages in accordance with one illustrative embodiment.

FIG. 5A is an example diagram illustrating an operation along a path from a source node to a destination node of using the request packets and reply messages in accordance with one illustrative embodiment. The operation outlined in FIG. 5A is intended to illustrate the manner by which the MTU field of an echo request with PMTU measurement packet may be updated as the packet is transmitted along a path. As a result, rather than detail the state of all of the fields of the packets in this depiction, only the MTU field is identified in the packets. It should be appreciated however that the other fields are updated as necessary and as previously described above.

The nodes 510-550 in FIG. 5A may represent data processing devices of various types. For example, the nodes 510-550 may be client computing devices, server computing devices, routers, switches, or any other data processing device that may be part of one or more data networks. In one illustrative embodiment, the source node 510 and end node 550 may be computing devices, such as server and client computing devices, server computing devices, or client computing devices, while the intermediate nodes 520-540 may be routers, switches, or other types of devices for routing data packets between a source and destination node. As a result, nodes 510 and/or 550 may have a configuration similar to that shown in FIG. 2 above while the other nodes 520-540 may have a configuration similar to known routers, switches, etc.

It should be appreciated that the nodes 510-550 may be augmented to include logic, either in hardware, software, or a combination of hardware and software, for performing the various operations of the illustrative embodiments. For example, the source node 510 may have logic for generating an echo request with PMTU measurement packet. The intermediate nodes 520-540 may have logic for checking the size of an echo request with PMTU measurement packet to determine if the packet is too large for the MTU for a next link along the path and then modify the echo request with PMTU measurement packet based on the determination without sending back a Packet Too Big message to the source node 510. The destination node 550 may have logic for receiving an echo request with PMTU measurement packet sent from the source node 510 and generate and return an echo reply with PMTU packet taking PMTU information from the received echo request with PMTU measurement packet. It should be also appreciated that a source node can, in another instance, be a destination node, and vice versa, as well as that in some instances the intermediate nodes may also be source or destination nodes in other paths, such that logic for source nodes and destination nodes may exist on each of the nodes 510-550.

As shown in FIG. 5A, the operation starts with source node 510 generating an echo request with PMTU measurement packet 560 in which the MTU field is set to an initial MTU value for the source node's link to a first intermediate node 520 along the path to the destination node 550. The packet 560 is then transmitted to the intermediate node 520. It should be noted that the packet 560 has type and code field values that inform the intermediate nodes 520-540 that the packet 560 is an echo request with PMTU measurement packet 560 and causes the intermediate nodes 520-540 to handle the packet 560 in the manner described herein for echo request with PMTU measurement packets 560 accordingly.

The intermediate node 520 has logic, either implemented in hardware, software, or a combination of hardware and software, for comparing the size of the packet 560 to a MTU for a next link along the path to a next intermediate node 530. Again, as described above, the node is aware of its outgoing links and the MTUs from the initial network configuration and routing tables. If the size of the packet 560 is less than or equal to the MTU of the next link along the path, then the intermediate node 520 may transmit the packet 560 without modification. If the size of the packet 560 is greater than the MTU of the next link along the path, then the size of the packet 560 is reduced by truncating the data field of the packet 560 and updating the MTU and packet length fields to represent the new size of the packet 560. This would be done without returning a Packet Too Big message to the source node 510 causing the source node to modify the original packet 560 and resend it. To the contrary, the packet 560 would be modified and allowed to continue along its path to the destination node 550. In the depicted example, however, it is assumed that the packet 560 has a size that is less than or equal to the MTU of the link between intermediate node 520 and intermediate node 530.

As shown in FIG. 5A, the packet 560 is then received by the next intermediate node 530 which again performs the size check with the MTU of the next link to the next intermediate node 540. In this case, however, it is determined that the size of the packet 560 is greater than the MTU of the next link to intermediate node 540. In prior art systems, such a determination would result in the intermediate node 530 returning a Packet Too Big message back to the source node 510. The source node 510 would then have to analyze the Packet Too Big message, generate a new packet having a size corresponding to the MTU of the next link to node 540, and send the new packet along the path causing the intermediate nodes 520 and 530 to repeat the earlier processing and causing additional traffic along the path as well as delay and overhead in determining the PTMU.

To the contrary, with the mechanisms of the illustrative embodiments, rather than returning a Packet Too Big message, the intermediate node 530 modifies the size of the packet 560 by truncating the data field portion of the packet 560 and modifying the MTU and packet length fields to reflect the MTU of the next link to node 540 and the new size of the packet 570 having the lower MTU. The newly sized and updated packet 570 is then transmitted to the next intermediate node 540 along the path.

The next intermediate node 540 performs a similar check and modification of the packet 570. That is, the next intermediate node 540 determines that the size of the packet 570 exceeds the MTU of the next link to the destination node 550 and thus, modifies the size of the data field of the packet 570 again and updates the MTU and packet length fields accordingly. The resulting packet 580 is transmitted to the destination node 550.

At the destination node 550, the destination node recognizes that the packet 580 is an echo request with PMTU measurement packet 580 based on the type and code field values. Further information in the packet (not shown) may designate the source and destination node addresses so that the destination node 550 knows not to forward this packet 580 along to another node and further to let the destination node 550 know where to send a reply message packet. The destination node 550 generates an echo reply with PMTU packet 590 taking information from the echo request with PMTU measurement packet 580 to populate fields in the echo reply with PMTU packet 590, e.g., the MTU field value.

The echo reply with PMTU packet 590 is transmitted back to the source node 510 along the path comprising links between intermediate nodes 520-540. The source node 510 receives the echo reply with PMTU packet 590 and extracts the PMTU from the packet 590. This PMTU value is then stored in the source node 510 for use in generating packets for transmission to the destination node 550 that have a size that is less than or equal to the PMTU value.

Figure 5B:
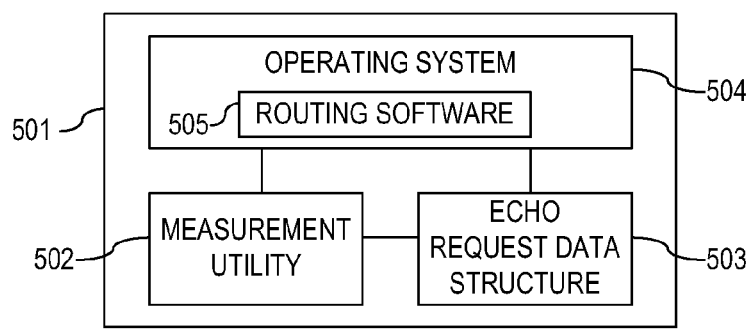
FIG. 5B is an example diagram illustrating some of the primary operational elements of a node in accordance with one illustrative embodiment.

FIG. 5B illustrates some of the primary operational elements of a node in accordance with one illustrative embodiment. As shown in FIG. 5B, the node 501, which may be a source node, intermediate node, or destination node, for example, comprises a measurement utility 502, an echo reply data structure 503, an operating system 504, and routing software 505. The node 501 may be computing device, such as that described above with regard to FIGS. 1 and 2, for example. The measurement utility 502 may be implemented in hardware, software, or any combination of hardware and software. The measurement utility 502 is configured with logic for performing the various measurement operations described above with regard to generating an "echo request with PMTU measurement" packet, such as described in FIG. 3, determining if a packet size is larger than a MTU of a link to the next node, modifying the "echo request with PMTU measurement" packet size based on such a determination, recording the MTU information in the "echo request with PMTU measurement" packet, and analyzing the echo reply packet to determine the PMTU. The measurement utility 502 may store echo request information, such as the identifier 340 and sequence number 350, in the echo request data structure 503 for use in matching echo reply packets when they are received. The information from the echo reply packets regarding the PMTU may be provided to the operating system 504 where such information may be stored in the routing software 505 or a data structure associated with the routing software 505 so that it may be used when determining routing of data packets between the node 501 and destination nodes.

Figure 6:
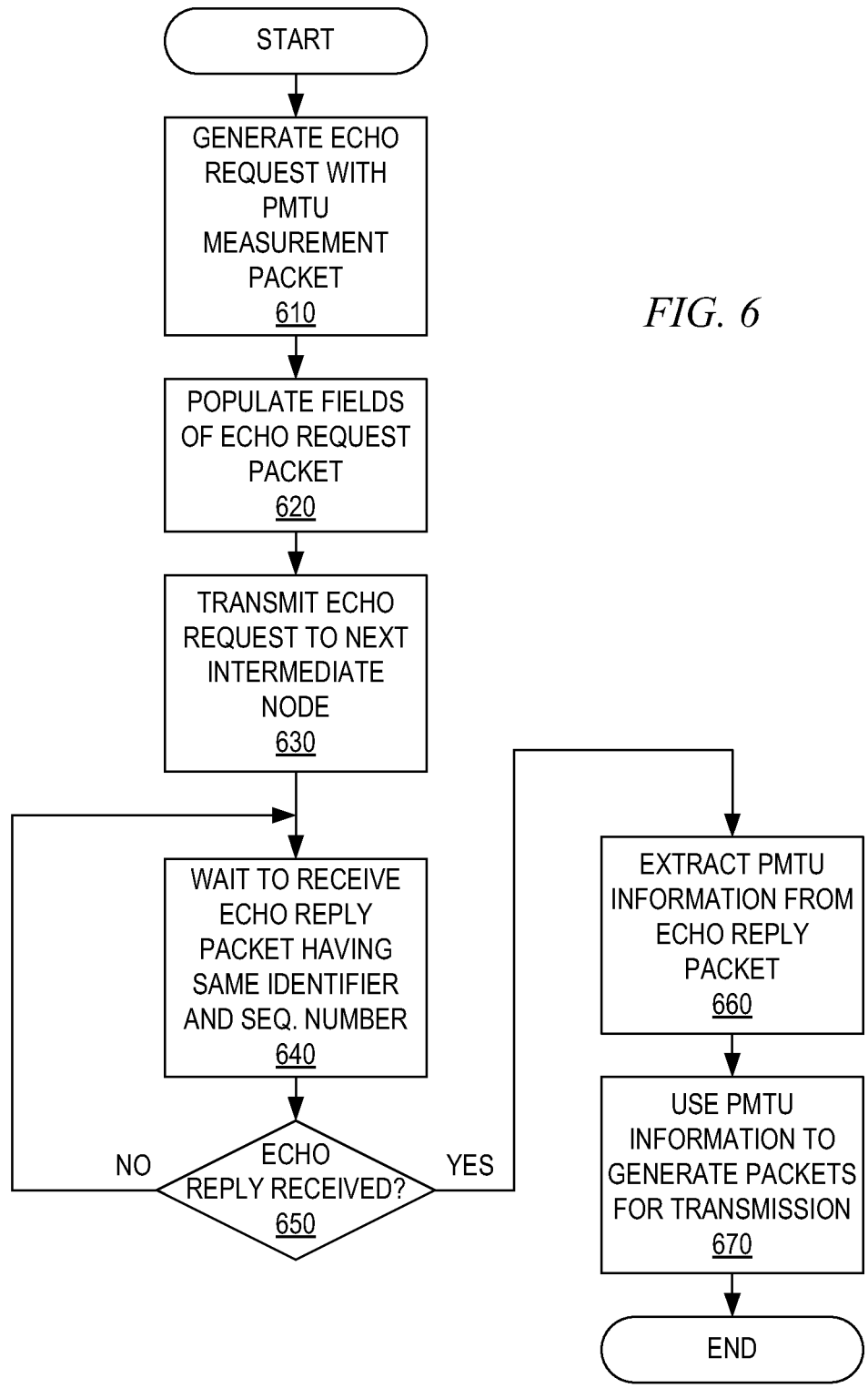
FIG. 6 is a flowchart outlining an example operation for a source node in accordance with one illustrative embodiment.

FIG. 6 is a flowchart outlining an example operation for a source node in accordance with one illustrative embodiment. As shown in FIG. 6, the source node generates an echo request with PMTU measurement packet (step 610) and populates fields of the packet with a type and code corresponding to an echo request with PMTU measurement packet, an identifier and sequence number, a MTU equal to the MTU for the first link to a first intermediate node, a portion of data comprising bytes set to 0 or another "don't care" value (step 620). The identifier and sequence number may be stored in an associated data structure for later use in matching an echo reply packet. The source node then transmits the echo request with PMTU measurement packet to a next intermediate node along the path (step 630) and waits for a echo reply packet having a same identifier and sequence number (step 640).

A determination is made as to whether an echo reply packet is received having a same identifier and sequence number as the original echo request packet (step 650). If not, the operation may check for a timeout condition (not shown) and if the timeout condition has not been met, may return to step 640 and continue to wait for the echo reply packet. If the timeout condition is met, the operation may terminate with an error resulting in a possible retry of the PMTU measurement.

If an echo reply packet having a same identifier and sequence number as the original echo request packet is received, then the source node extracts the PMTU information from the echo reply packet (step 660) and uses the PMTU information to generate packets for transmission to the destination node (step 670). The operation then terminates.

Figure 7:
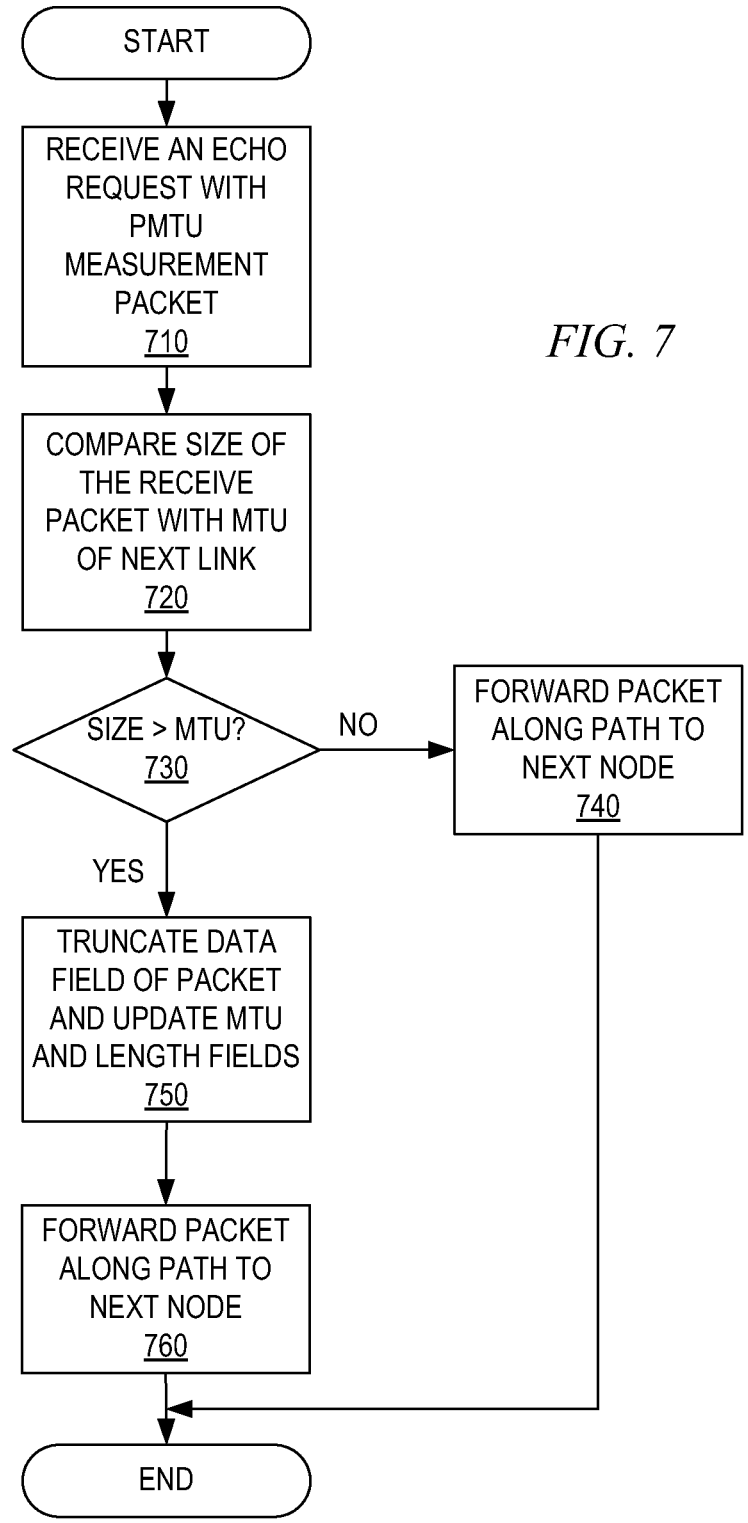
FIG. 7 is a flowchart outlining an example operation for an intermediate node in accordance with one illustrative embodiment.

FIG. 7 is a flowchart outlining an example operation for an intermediate node in accordance with one illustrative embodiment. As shown in FIG. 7, the operation starts with the receipt of an echo request with PMTU measurement packet (step 710). The intermediate node compares a size of the received packet with an MTU of a next link to a next node along the path (step 720). A determination is made as to whether the size of the received packet is greater than the MTU of the next link (step 730). If the size of the received packet is not greater than the MTU of the next link, then the packet is forwarded along the path to the next node (step 740). If the size of the received packet is greater than the MTU of the next link, then the packet's size is reduced by truncating the data field and the MTU and packet length fields are updated to reflect the smaller MTU (step 750). The modified packet is then transmitted along the path to the next node (step 760) and the operation terminates.

Figure 8:
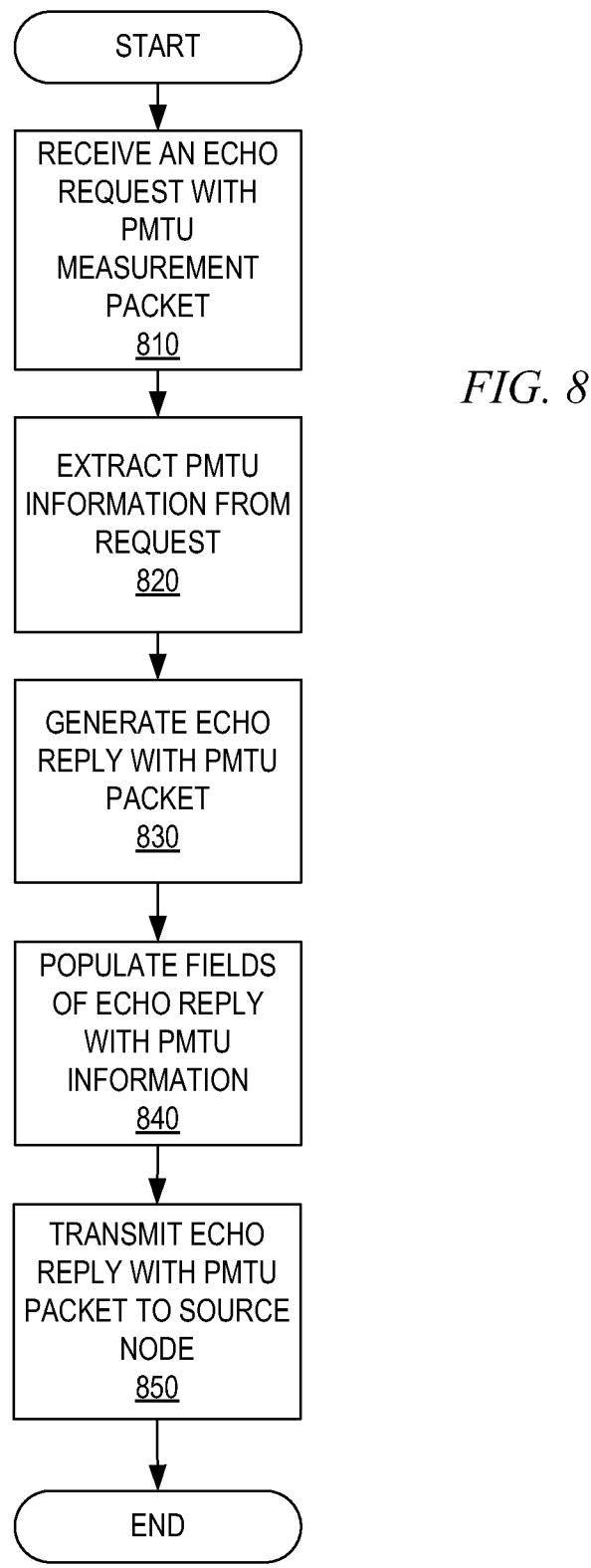
FIG. 8 is a flowchart outlining an example operation for a destination node in accordance with one illustrative embodiment.

FIG. 8 is a flowchart outlining an example operation for a destination node in accordance with one illustrative embodiment. As shown in FIG. 8, the operation starts with receiving an echo request with PMTU measurement packet (step 810). The destination node extracts the PMTU information from the fields of the echo request with PMTU measurement packet (step 820) and generates an echo reply with PMTU packet (step 830). The destination node populates fields of the echo reply with PMTU packet with information extracted from the echo request with PMTU measurement packet including the identifier and sequence number, the minimum MTU stored in the MTU field of the echo request, and the like, as previously described above (step 840). The destination node then transmits the echo reply with PMTU packet back along the path to the source node (step 850) and the operation terminates.

Thus, the illustrative embodiments provide mechanisms for measuring a path MTU without having to incur the overhead of repeated packet send/Packet Too Big message processing as is required in known mechanisms. The mechanisms of the illustrative embodiments allow the source node to send a single echo request with PMTU measurement packet along the path and receive the PMTU information back in an echo reply with PMTU packet without having to repeatedly process Packet Too Big message packets. In this way, the overhead, delay, and traffic congestion along the path between the source and destination nodes is reduced.

It should be appreciated that in some instances, not all of the intermediate nodes along a path may implement the logic according to the illustrative embodiments for inhibiting the sending of a Packet Too Big message and instead modifying the echo request with PMTU measurement packet based on the MTU of a next link along the path. In such a case, the intermediate nodes that do not implement the logic of the illustrative embodiments may return a Packet Too Big message to the source node. The source node may then perform a similar operation as is in the known art with regard to generating a new smaller packet and sending it out again along the path. Thus, in some instances, there may be some packet send/Packet Too Big message processing, but if any of the intermediate nodes implement the mechanisms of the illustrative embodiments, those intermediate nodes will contribute to reducing the overhead, delay, and traffic along the path when determining the PMTU.

The mechanisms of the illustrative embodiments may be implemented in the IPv6 hop-by-hop option. The IPv6 hop-by-hop option mandates that every intermediate node/router process the echo request with PMTU packets of the illustrative embodiments. Thus, for example, every intermediate node will process echo request with PMTU packet 300 and then take actions discussed above. The hop-by-hop option extension header for this IPv6 option may keep a pointer into the MTU field in the echo request with PMTU packet 300. Each intermediate node will require processing this extension header option and thus, process the packet 300 and update the MTU field using the pointer in the IPv6 extension header if the outgoing link MTU is less than the value contained in the MTU field. As a result, there is no need to set the packet size to the MTU size and subsequent truncation by routers. Rather, packet size can now be set to a size needed to contain the IP header and header extension.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for determining a path maximum transmission unit of a path between a source node and a destination node of the path, comprising:
    receiving, at an intermediate node of at least one intermediate node along the path, an echo request packet from the source node;
    determining, by the intermediate node, whether a size of the echo request packet is greater than a maximum transmission unit (MTU) of a next link of the path from the intermediate node to a next node along the path;
    recording, by the intermediate node, the MTU of the next link in a path MTU field of the echo request packet in response to the determination that the size of the echo request packet is greater than the MTU of the next link; and
    reducing, by the intermediate node, a size of the echo request packet in response to a determination that the size of the echo request packet is greater than the MTU of the next link, wherein:
    a data portion of the echo request packet is filled with one of zero values or a don't care value, and wherein reducing the size of the echo request packet comprises reducing a size of the data portion of the echo request packet,
    the path MTU field of the echo request packet stores a smallest MTU value of all of the links along the path from the source node to the destination node that the echo request packet has so far traversed as a path MTU value which is updated dynamically as the echo request packet is transmitted along the path,
    the intermediate node does not return a packet too big message back to the source node in response to the size of the echo request packet being greater than the MTU of the next link of the path from the intermediate node to a next node along the path, and
    the source node is informed of a difference in a path MTU (PMTU) for the path from the source node to the destination node only by an echo reply packet returned by the destination packet in response to receiving the echo request packet from the source node.

2. The method of claim 1, further comprising:
    transmitting, by the intermediate node, the echo request packet along the path from the intermediate node to the destination node; and
    transmitting, by the destination node, an echo reply packet back to the source node in response to receiving the echo request packet.

3. The method of claim 2, wherein a size of the echo request packet sent by the source node is greater than a size of the echo request packet received at the destination node, and wherein the echo reply packet has a size corresponding to the path MTU value specified in the path MTU field of the echo request packet received at the destination node.

4. The method of claim 2, wherein the echo reply packet contains an MTU field that is populated with the path MTU value obtained from the path MTU field of the echo request packet and corresponds to the path MTU for the path from the source node to the destination node.

5. The method of claim 4, wherein the MTU value in the MTU field of the echo reply packet is a smallest MTU of the links along the path from the source node to the destination node.

6. The method of claim 2, wherein, in response to there being more than one intermediate node in the at least one intermediate node, the operations of determining whether a size of the echo request packet is greater than a MTU of a next link of the path, recording the MTU of the next link in the echo request packet, and transmitting the echo request packet along the path are repeated at each intermediate node.

7. The method of claim 1, wherein the echo request packet comprises a type field and a code field, and wherein the type field specifies the echo request packet to be an echo request packet, and wherein the code field specifies that the echo request packet is a packet that includes path MTU information.

8. A computer program product comprising a non-transitory computer readable storage medium having a computer readable program stored therein, wherein the computer readable program, when executed on an intermediate node of at least one intermediate node along a path from a source node to a destination node, causes the intermediate node to:
    receive an echo request packet from the source node;
    determine whether a size of the echo request packet is greater than a maximum transmission unit (MTU) of a next link of the path from the intermediate node to a next node along the path;
    record the MTU of the next link in the echo request packet in response to the determination that the size of the echo request packet is greater than the MTU of the next link; and
    reduce a size of the echo request packet in response to a determination that the size of the echo request packet is greater than the MTU of the next link, wherein:
    a data portion of the echo request packet is filled with one of zero values or a don't care value, and wherein reducing the size of the echo request packet comprises reducing a size of the data portion of the echo request packet,
    the path MTU field of the echo request packet stores a smallest MTU value of all of the links along the path from the source node to the destination node that the echo request packet has so far traversed as a path MTU value which is updated dynamically as the echo request packet is transmitted along the path,
    the intermediate node does not return a packet too big message back to the source node in response to the size of the echo request packet being greater than the MTU of the next link of the path from the intermediate node to a next node along the path, and
    the source node is informed of a difference in a path MTU (PMTU) for the path from the source node to the destination node only by an echo reply packet returned by the destination packet in response to receiving the echo request packet from the source node.

9. The computer program product of claim 8, wherein the computer readable program further causes the intermediate node to:
    transmit the echo request packet along the path from the intermediate node to the destination node, and wherein the destination node transmits an echo reply packet back to the source node in response to receiving the echo request packet.

10. The computer program product of claim 8, wherein a size of the echo request packet sent by the source node is greater than a size of the echo request packet received at the destination node, and wherein the echo reply packet has a size corresponding to the path MTU value specified in the path MTU field of the echo request packet received at the destination node.

11. The computer program product of claim 9, wherein the echo reply packet contains an MTU field that is populated with the path MTU value obtained from the path MTU field of the echo request packet and corresponds to the path MTU for the path from the source node to the destination node.

12. The computer program product of claim 11, wherein the MTU value in the MTU field of the echo reply packet is a smallest MTU of the links along the path from the source node to the destination node.

13. The computer program product of claim 9, wherein, in response to there being more than one intermediate node in the at least one intermediate node, the operations of determining whether a size of the echo request packet is greater than a MTU of a next link of the path, recording the MTU of the next link in the echo request packet, and transmitting the echo request packet along the path are repeated at each intermediate node.

14. The computer program product of claim 9, wherein the echo request packet comprises a type field and a code field, and wherein the type field specifies the echo request packet to be an echo request packet, and wherein the code field specifies that the echo request packet is a packet that includes path MTU information.

15. An apparatus, comprising:
a processor; and
a memory coupled to the processor, wherein the memory comprises instructions which, when executed by the processor, cause the processor to:
receive an echo request packet from a source node in a data transmission path from the source node to a destination node, the path comprising one or more intermediate nodes, and wherein the apparatus is one of the one or more intermediate nodes;
determine whether a size of the echo request packet is greater than a maximum transmission unit (MTU) of a next link of the path from the apparatus to a next node along the path;
record the MTU of the next link in the echo request packet in response to the determination that the size of the echo request packet is greater than the MTU of the next link; and
reduce a size of the echo request packet in response to a determination that the size of the echo request packet is greater than the MTU of the next link, wherein:
a data portion of the echo request packet is filled with one of zero values or a don't care value, and wherein reducing the size of the echo request packet comprises reducing a size of the data portion of the echo request packet,
the path MTU field of the echo request packet stores a smallest MTU value of all of the links along the path from the source node to the destination node that the echo request packet has so far traversed as a path MTU value which is updated dynamically as the echo request packet is transmitted along the path,
the intermediate node does not return a packet too big message back to the source node in response to the size of the echo request packet being greater than the MTU of the next link of the path from the intermediate node to a next node along the path, and
the source node is informed of a difference in a path MTU (PMTU) for the path from the source node to the destination node only by an echo reply packet returned by the destination packet in response to receiving the echo request packet from the source node.

* * * * *